United States Patent [19] [11] Patent Number: 4,995,799
Hayashi et al. [45] Date of Patent: Feb. 26, 1991

[54] OPTICAL DISC MANUFACTURING APPARATUS

[75] Inventors: Ryutaro Hayashi; Noriaki Kaneko, both of Saitama, Japan

[73] Assignee: Pioneer Electronic Corporation, Tokyo, Japan

[21] Appl. No.: 258,351

[22] Filed: Oct. 17, 1988

[30] Foreign Application Priority Data

Oct. 15, 1987 [JP] Japan ................. 62-259904

[51] Int. Cl.⁵ ................. B29D 17/00; B29C 33/06
[52] U.S. Cl. .................. 425/111; 264/1.3; 264/22; 264/106; 264/107; 425/112; 425/145; 425/174.4; 425/810
[58] Field of Search .......... 264/106, 107, 1.3, 22, 264/82, 83; 425/810, 135, 145, 110, 116, 111, 112, 174.4

[56] References Cited

U.S. PATENT DOCUMENTS

| 3,271,483 | 9/1966 | Phillipson et al. | 425/155 |
| 3,412,427 | 11/1968 | Flusfeder et al. | 264/107 |
| 4,197,267 | 4/1980 | Gustavsson | 264/24 |
| 4,249,876 | 2/1981 | Stransfeld et al. | 425/810 |
| 4,301,099 | 11/1981 | Broeksema et al. | 264/107 |
| 4,435,343 | 3/1984 | Ando et al. | 264/107 |
| 4,449,916 | 5/1984 | Ito et al. | 264/107 |
| 4,670,077 | 6/1987 | Peeters | 264/106 |
| 4,723,903 | 2/1988 | Okazaki et al. | 425/810 |

FOREIGN PATENT DOCUMENTS

| 58-36417 | 3/1983 | Japan | 264/107 |
| 60-122140 | 6/1985 | Japan | 264/107 |
| 60-122141 | 6/1985 | Japan | 264/107 |
| 60-224532 | 10/1985 | Japan | 264/107 |
| 60-237654 | 11/1985 | Japan | 264/107 |
| 60-261047 | 12/1985 | Japan | . |
| 61-64734 | 4/1986 | Japan | 264/83 |
| 61-180948 | 8/1986 | Japan | 264/1.3 |
| 62-138210 | 6/1987 | Japan | 425/810 |

Primary Examiner—Jay H. Woo
Assistant Examiner—Khanh P. Nguyen
Attorney, Agent, or Firm—Sughrue, Mion, Zinn, Macpeak & Seas

[57] ABSTRACT

Disclosed herein is an apparatus for manufacturing an optical substrate which has a transfer layer corresponding to an optical pattern by supplying a liquid radiation-setting resin between a stamper carrying the optical pattern and the substrate and by setting the radiation-setting resin. The apparatus includes a turnable, a center boss, gas pressure control mean, and a defoaming means including an outer circumferential means to defoam the radiation-setting resin. The turnable, the center boss and the gas pressure control means are united into a carriage base which is movable on the casing of the apparatus.

10 Claims, 14 Drawing Sheets

OPTICAL DISC MANUFACTURING APPARATUS

BACKGROUND OF THE INVENTION

1. Field of the Invention

The present invention relates to an apparatus for manufacturing an optical disc which has a transfer layer carrying fine undulations of a liquid radiation setting resin (which will be shortly referred to as a "photopolymer"). The resin is set by exposure to radiation such as ultraviolet rays. The optical disc used herein means a substrate one which a recording layer will be applied in a subsequent process as is well known in the art.

2. Description of the Prior Art

In the prior art, two optical discs or substrate have been employed, one of which is formed on a transparent disc and has a row of pits representing information signals arranged in concentric rings or a spiral shape, and a second of which has a spiral guide groove into which additional information can be written using a laser spot, after the disc has been manufactured. The process for manufacturing an optical disc having fine undulations on its surfaces such as the pit row or a guide groove is described in Japanese Patent Laid-Open Nos. 53-116105, 54-23501 and 54-2350, for example. In any of these manufacturing processes, the photopolymer is carried on the disc and the transfer region of a stamper having predetermined fine undulations (or patterns) thereon is brought into contact with the photopolymer. This photopolymer is then exposed to ultraviolet rays causing it to set and thus form a transfer layer on the disc.

However, when the photopolymer is extended between the disc and the stamper, according to these manufacturing processes, a defect occurs, wherein fine foams are created in the photopolymer. Generally speaking, the pitch of the pit rows in the radial direction of the optical disc is as small as about 1.6 microns. As a result, the creation of foams in the photopolymer during the transfer step is detrimental to the drop-out of the pits or the guide groove.

A technique for preventing the formation foams in the photopolymer between the disc and the stamper is disclosed in our Japanese Patent Laid-Open No. 60-261047 which is directed to an optical disc manufacturing process. This manufacturing method will be described with reference to FIG. 16 showing a portion of an optical disc manufacturing apparatus.

Initially, as shown in FIG. 16(a), a stamper 1 is fixed in position on a base 2 and supplied with a photopolymer 5. Then, a transparent disc 4 made of PMMA is placed on the outer circumferential flange of a center boss 3.

Next, the center boss 3 is dropped to bring the disc 4 into contact with the photopolymer on the stamper 1. In this state, foams are confined in a photopolymer 5.

Next, as shown in FIG. 16(b), the disc 4 is held at its outer circumference by a holding member 6 (or ring) such that the outer circumferences of the stamper 1 and the disc 4 sandwich the photopolymer 5 therebetween.

Next, as shown in FIG. 16(c), the center boss 3 is moved upwards to push the inner circumference of the disc 4 upward. Since the disc 4 has its outer circumference fixed in place by the outer circumferential ring 6, the disc 4 is deformed into a conical or Konide shape, as shown. Thus, an enclosed space having a flattened conical shape is formed over the center recess of the base 2 and between the disc 4 and the stamper 1. As the center boss 3 moves upward, the photopolymer 5 spreads toward the outer circumference. At this time the larger foams having a diameter of 0.5 mm or more in the photopolymer 5 disappear in accordance with the outward spread of the photopolymer. However, the smaller foams are collected and confined in the annular stagnant photopolymer.

Here, the closed space formed among the center boss 3, the disc 4 and the stamper 1 communicates with a gas pressure control means for pressurizing or evacuating the area in the vicinity of the center boss. As a result, the innermost circumference of the photopolymer 5 vibrates, thus eliminating the foams in the photopolymer 5 when a small amount of pressurized gas is supplied from the center recess of the base 2 by the gas pressure control means while a sealed state exists.

Next, during a transfer step as shown in FIG. 16(d), the pressurization is interrupted, while the sealed state of the center recess is maintained, and the gas is sucked out by evacuation. Then, the photopolymer 5 flows from the outer circumference to the inner circumference between the stamper 1 and the disc 4 as a result of the pressure difference from the atmospheric pressure. The center boss 3 is then dropped. This causes the photopolymer 5 flowing from the outer to the inner circumference between the disc 4 and the stamper 1 to reach the innermost circumference of the transfer region until it is either completely consumed before it reaches the innermost circumference of the stamper 1 or is discharged to the outermost circumference of the stamper 1.

Next, as shown in FIG. 16(e), the center boss 3 is further dropped until it stops at a predetermined position where the entire surface of the disc 4 is generally coextensive with the stamper surface.

The outer circumferential ring 6 is then removed while the evacuation of the enclosed space in the vicinity of the lower side of the inner circumference of the center boss 3 is maintained, and the photopolymer 5 is set by exposure to ultraviolet rays.

If the disc 4 is separated from the stamper 1 by lifting the center boss 3 after the photopolymer 5 has been set, it is possible to obtain a disc 4 which has a set photopolymer layer 5 onto which the fine undulations of the stamper 1 have been transferred.

In this manufacturing process, however, if the evacuation is accomplished while the sealed state is maintained in the center recess, the photopolymer 5 is caused to proceed from the outer circumference to the inner circumference between the stamper 1 and the disc 4 as a result of the pressure difference from atmospheric pressure, as shown in FIG. 16(d). When the photopolymer 5 flows from the outer to the inner circumferences it may confine fine foams, which might not be eliminated by the cooperation between the outer circumferential ring and the center boss. The confinement of the fine foams in the photopolymer 5 lowers the yield of the optical disc.

SUMMARY OF THE INVENTION

The present invention has been developed to eliminate the above-specified defects and to provide an optical disc manufacturing apparatus which can reduce the confinement of the fine foams when the photopolymer spreads from the outer to the inner circumferences of the disc during the foam elimination step in the manufacturing process.

According to the present invention, an optical disc manufacturing apparatus is provided in which a disc is formed having a transfer layer corresponding to an optical pattern by supplying a liquid radiation-setting resin between a stamper carrying the optical pattern and the disc, and then setting said radiation-setting resin, comprising: a support member which is movable across the frame of the apparatus, a turntable including a flat portion carrying the stamper and having a recess at its center; a center boss arranged in the recess which is rotatable on the same axis of rotation as the turntable, and movable along that axis of rotation together with the turntable: means for pushing the outer circumference of the disc onto the flat portion of the turntable and gas pressure control means communicating with the recess of the turntable for adjusting the pressure in the recess.

BRIEF DESCRIPTION OF THE DRAWINGS

Other objects, features and advantages of the present invention will be described in the following with reference to the accompanying drawings, in which.

DESCRIPTION OF THE PREFERRED EMBODIMENT

The present invention will be described in the following in connection with one embodiment thereof with reference to the accompanying drawings.

Figure 1:
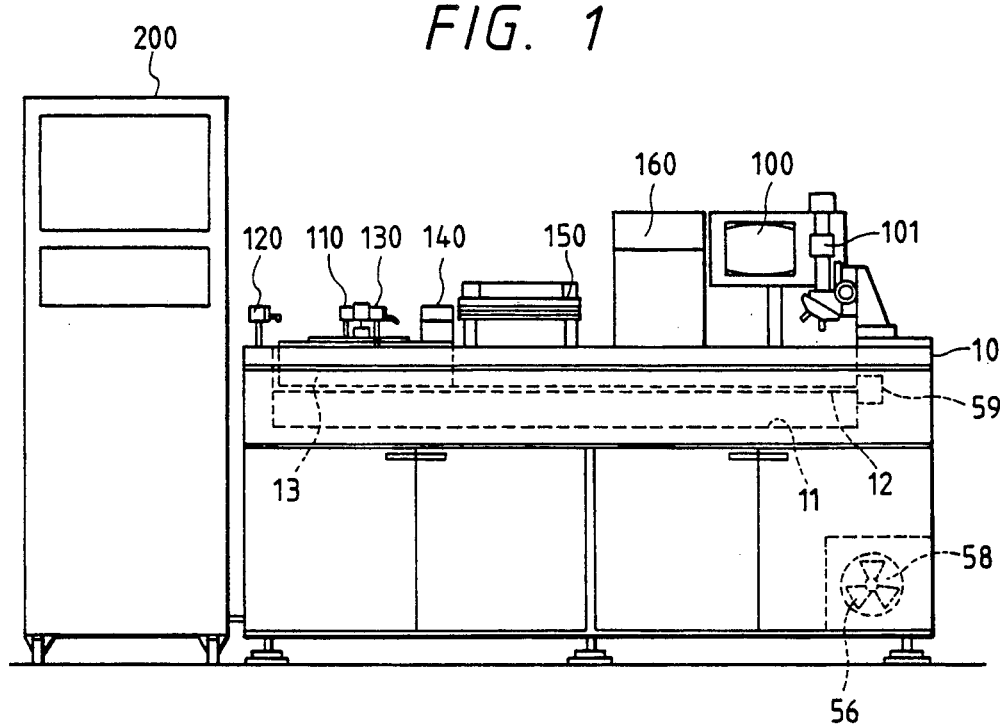
FIG. 1 is a front elevation schematically showing a manufacturing apparatus according to the present invention.
Figure 2:
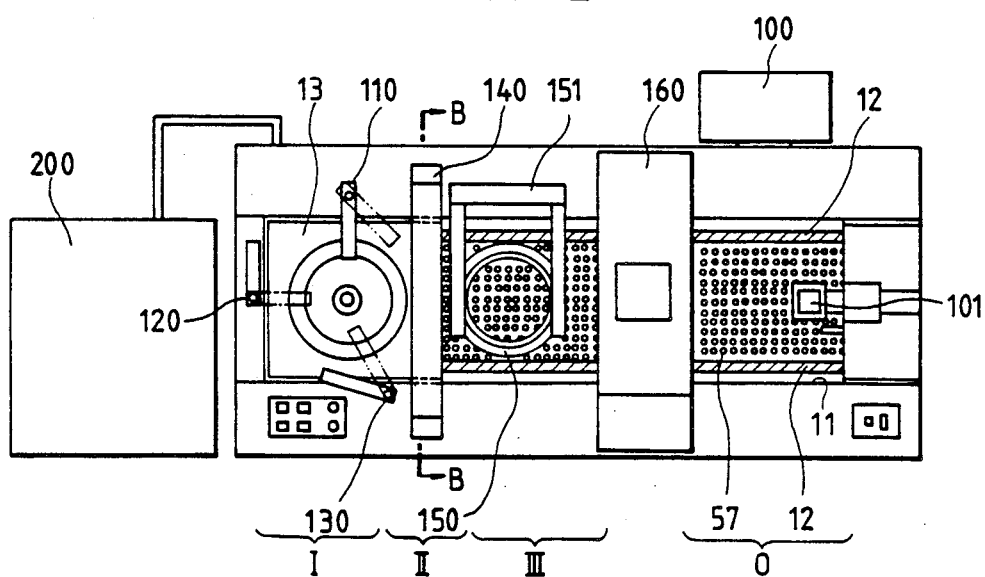
FIG. 2 is a top plan view schematically showing the manufacturing apparatus of the present invention.

FIGS. 1 and 2 are a front elevation and a top plan view schematically showing an optical disc manufacturing apparatus according to an embodiment of the present invention. The optical disc manufacturing apparatus has a generally rectangular casing 10 with a guide groove 11 of rectangular cross-section extending in the longitudinal direction of the casing 10. Along this guide groove 11, rails 12 are laid on which a carriage base 13 can move in the horizontal direction (i.e., to the right and left, as seen in FIGS. 1 and 2).

Figure 3:
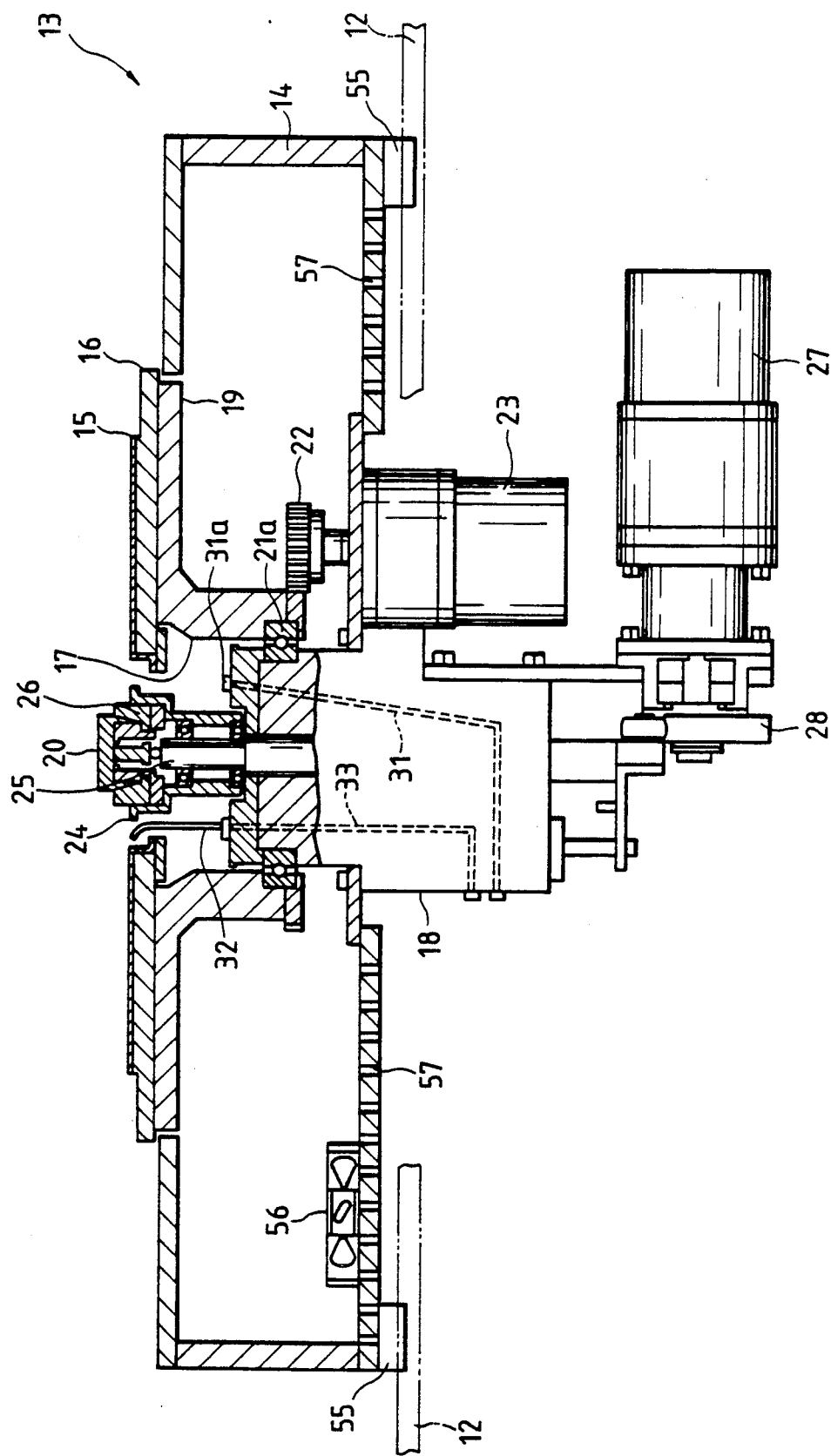
FIG. 3 is a partially cut-away section schematically showing a carriage base of the manufacturing apparatus of the present invention.

A rectangular base casing 14 of the carriage 13, as shown in a partially cut-away section in FIG. 3, has disposed therein a turntable 19 and a center boss 20. The turntable 19 is rotatable and has a flattened circular, horizontal portion 16 (or stamper base) carrying a stamper 15, and a recess 17 located at the center thereof. The center boss 20 is disposed on a center boss support 18 so that the boss 20 rotates together with the turntable 19, and is arranged in the center recess 17, so that it is allowed to move vertically. Moreover, the turntable 19 is connected through a bearing 21a and a gear 22 to a motor 23 so that turns on the longitudinal center axis of the center boss 20. This turntable 19 is equipped with an eccentricity adjusting mechanism having a micrometer for finely moving the stamper base 16 horizontally relative to the turntable 19. Thus, the stamper base 16 can be freely adjusted in the x- and y-directions on a horizontal plane over the turntable 19. The center boss 20 has a flange 24 formed around its head to which the inner circumference of a center hole of a transparent disc can be fitted. The head of the center boss 20 has a chuck 26 disposed above the flange 24 which is actuated by an air cylinder mechanism 25 for internally fixing the inner circumference of the center hole of the disc. When actuated, the chuck 26 is changed into a cylinder having an external diameter equal to the internal diameter of the center hole of the disc to be fixed, and the chuck 26 is aligned with the center axis of the center boss 20 in order to center the center boss 20 and the disc.

Moreover, a center boss lifting mechanism which comprises a motor 27, a cam 28, is connected to the center boss 20. This center boss lifting mechanism is constructed to position the flange surface 24 (carrying the disc) of the center boss 20 in a plane (at its lowermost position) higher than the principal plane of the stamper 15 by a thickness equal to a transfer layer to be formed, so that the center boss 20 can move the disc to an arbitrary position higher than the lowermost position.

Figure 4:
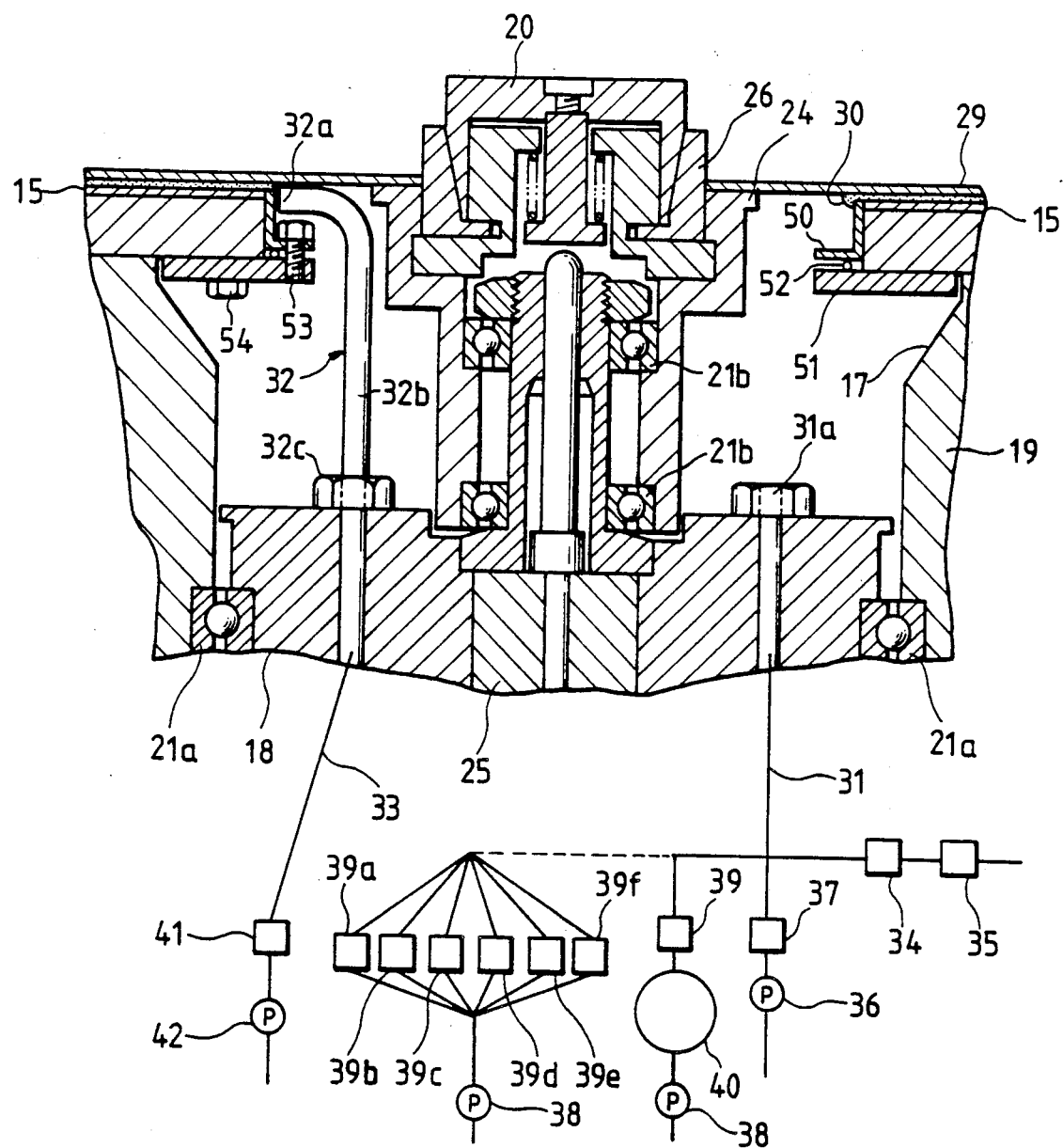
FIG. 4 is an enlarged section schematically showing the vicinity of a center boss of the carriage base of the manufacturing apparatus of the present invention.

FIG. 4 is an enlarged partial section showing the vicinity of the recess 17 when a disc 29 is placed on the flange 24 while sandwiching a photopolymer 30 between the disc 24 and the stamper 15 when the center boss 20 is in its lowermost position. The center boss support 18 is supported by the bearing 21a, and the air cylinder mechanism 25 is supported by a bearing 21b so that the turntable 19 and the center boss 20 can rotate. The upper surface of the center boss support 18 has an opening 31a for a gas passage 31 which communicate with gas pressure control means and the recess 17.

Moreover, the bottom of the recess 17 is equipped with a suction nozzle 32 for sucking the photopolymer 30 which may overflow from between the stamper 15 and the disc 29. As shown in FIG. 4, the suction nozzle 32 is composed of a conduit 32b having its suction port 32a opened in the vicinity of the inner circumference of the center hole or in the inner circumferential edge of the center recess 17 of the center hole of the fixed stamper 15, and a plinth 32c fixing the conduit 32b in the bottom wall of the recess 17. Moreover, the suction nozzle 32 is in communication with the gas pressure control means by way of a gas passage 33 in the center boss support 18.

These gas passages 31 and 33 are connected to the gas pressure control means. For gas pressure controls, the gas passage 31 is equipped with an electromagnetic valve for opening or closing it to the atmosphere; and a relief valve 35 for controlling gas leakage in order to keep the difference between the pressure in the recess 17 and the atmospheric pressure constant when suction is established through the suction nozzle 32. Further provided in the gas passage 31 are a pressure pump 36 for supplying pressurized gas to the recess 17 during initial contact with the disc 29 and separation from the disc 29. Further provided in the gas passage 31 are a pressure reducing pump 38 for reducing the pressure in the recess 17 during a pressurized defoaming operation, an electromagnetic valve 39 for opening or closing the pressure-reducing pump 38, and a plenum chamber 40.

This plenum chamber 40 is of predetermined capacity so that the pressure in the recess 17 is not reduced abruptly but gradually buffers the pressure reduction when the pressure is reduce by the pressure-reducing pump 38. When the electromagnetic valve 39 and the pressure-reducing pump 38 are energized, pressure reduction occurs first in the plenum chamber 40 and then in the recess 17.

In order to accomplish this gentle pressure reduction in the recess 17, the plenum chamber 40 may be replaced by a piping system, as indicated by the broken line in FIG. 4, which shows six parallel electromagnetic valves 39a to 39f communicating with the pressure-reducing pump 38 and with the gas passage 31. In this embodiment, the electromagnetic valves 39a to 39f can be sequentially opened one by one to gradually reduce the pressure in the recess 17.

On the other hand, the gas passage 33 is equipped with a suction pump 42 for sucking the photopolymer 30 through an electromagnetic valve 41. The electromagnetic valves 34, 37, 39 (i.e., 39a to 39f) and 41, and the pumps 36, 38 and 42 described above together constitute the gas pressure control means and are independently controlled by a control unit 200 shown in FIGS. 1 and 2.

On the other hand, a metal ring 50 is disposed in the inner circumference of the center hole of the stamper base 16 over the recess 17. The metal ring 50 is fixed on a holding annular member 51 through an O-ring 52 by screws 53. The metal ring 50 has an external diameter which is sized to fit the internal diameter of the center hole of the stamper 15 so that it can absorb the dispersion in the inner circumference of the stamper 15. The metal ring 50 is fitted in the recess so that its upper end face can be adjusted to be flush with the stamper surface by the screws 53. When the metal ring 50 is to be removed, a cap screw 54 is loosened to release the metal ring 50.

When the disc 29 and the stamper 15 are to be separated so that they are no longer in close contact through the photopolymer 30 during the defoaming step or during the separation after exposure to radiation, excess stress will be exerted upon the inner circumferential portion of the stamper center hole to fatigue that portion. However, the provision of metal ring 50 can prevent the inner circumferential portion of the stamper 15 from getting fatigued. Specifically, the metal ring 50 endures that stress thus allowing the stamper inner circumferential portion to be stressed only downward, and thus the lifetime of the stamper 15 can be prolonged.

Only one suction nozzle 32 is arranged radially around the center boss 20, as shown in FIG. 4, but a plurality of suction nozzles may likewise be provided. If a plurality of suction nozzles are provided, the photopolymer 30 overflow can be immediately sucked out.

Referring again to FIG. 3, the external bottom wall of the base casing 14 is equipped with legs 55 for engagement with the paired rails 12 laid along the guide groove 11 of the casing 10. On the other hand, the internal bottom wall of the base casing 14 is provided with an electric fan 56 and a plurality of through holes 57 for releasing the downward gas flow, in the space between the circumference of the turntable 19 and the base casing 14, from this casing 14 into the apparatus casing 10. Similar through holes 57 for the downward gas flow are also formed in the bottom wall of the guide groove 11 of the apparatus casing 10, as better seen in FIG. 5. As a result of this construction, the individual casings 10 and 14 are evacuated by a downward gas flow so that any dust generated by drive members such as gears in those casings is prevented from rising up to the turntable. Thus, the transfer process can be accomplished in a dust-free environment. If an exhaust port 58 for exhausting gases to the outside is formed in the apparatus casing 10, then the electric fan 56 causing the downward gas flow can also be disposed in the apparatus casing 10. The plural through holes 57 in the walls of the casings 10 and 14 may be made in a woven or punched metallic plate.

On the other hand, the carriage base 13 can be horizontally moved along the guide groove 11 by forming the rails 12 into worms and the legs into racks, for example, and by rotating the worms by a motor 59 which is disposed in the casing 10.

The casing 10 is partitioned, as shown in FIG. 2, into initial, first, second and third stations (0, I, II and III) where the carriage base 13, moved on the rails 12 along the guide groove 11 may be stopped so that operations of predetermined steps can be performed.

First of all, at the initial setting station 0 located at one end of the guide groove 11 in the casing 10, an eccentricity adjustment monitor is disposed over the casing 10 along the end portion of the guide groove 11. The eccentricity adjustment monitor is composed of a display 100 and a microscope 101. The carriage base 13 is stopped below the microscope 101 and the annular transfer region of the stamper 15 is aligned with the turntable and the center boss 20 using both the eccentricity adjustment monitor at the side of the casing 10 and the eccentricity adjusting means with the micrometer at the side of the carriage base 13 so that the annular transfer region can be adjusted to turn concentrically on the center axis of the center boss 20.

Figure 5:
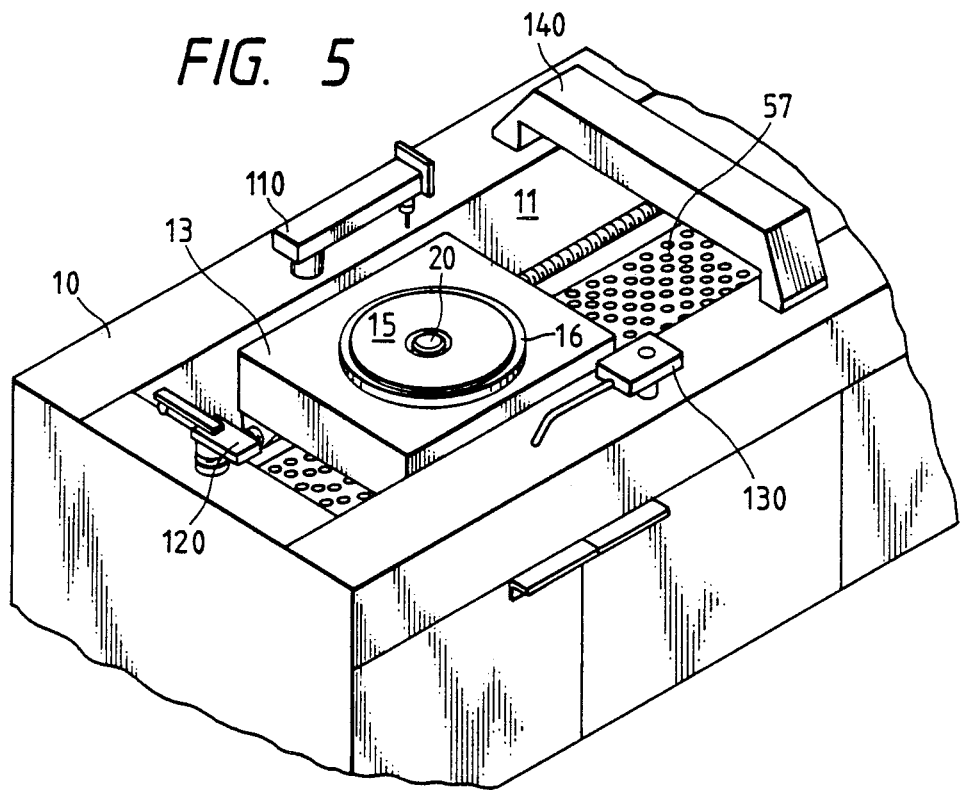
FIG. 5 is a perspective view showing a casing and the carriage base of the manufacturing apparatus of the present invention.

At the first station I located at the other end portion of the guide groove 11 in the casing 10, as shown in FIG. 5, a photopolymer discharge mechanism 110, an initial contact mechanism 120 and an excess photopolymer suction mechanism 130 are arranged along three sides so as to enclose the end portion of the guide groove 11.

Figure 6:
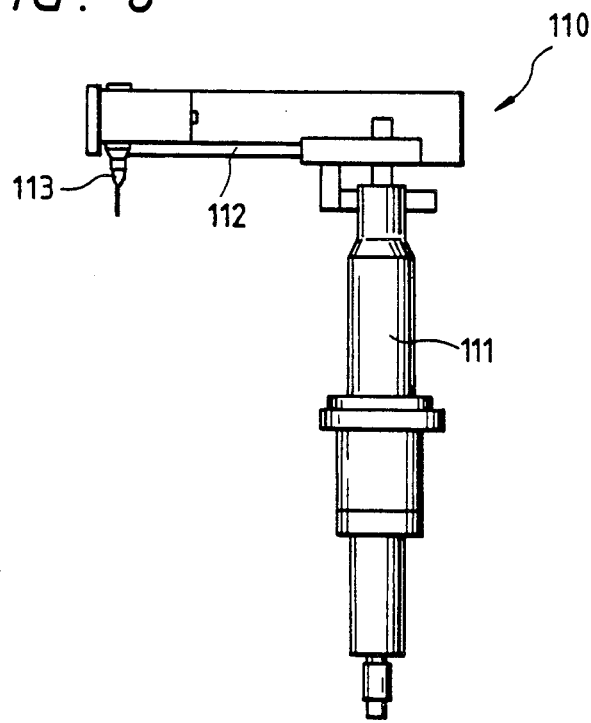
FIG. 6 is a schematic side elevation for explaining a photopolymer discharge mechanism of the manufacturing apparatus of the present invention.

The photopolymer discharge mechanism 110 is equipped, as shown in FIG. 6, with an arm 112 which is hinged on a rotation mechanism 111 fixed to the casing 10 so that it can move in parallel with the turntable surface. The arm 112 carries on its free end portion a discharge nozzle 113 for dispersing the photopolymer onto the principal surface of the stamper 15.

Figure 7A:
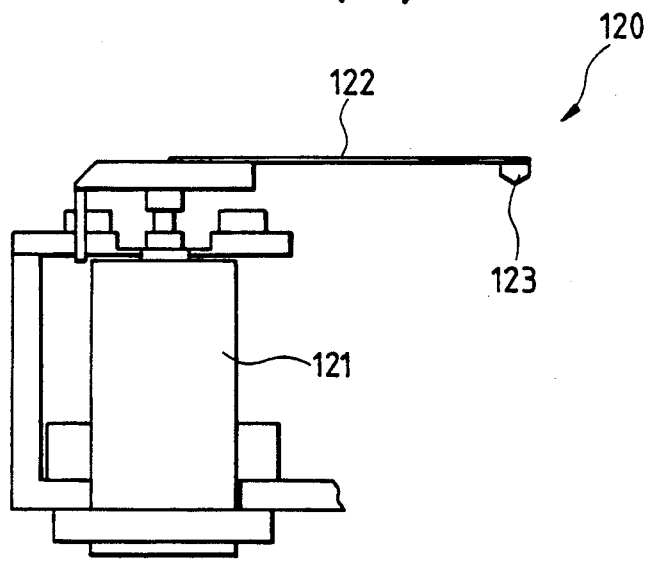
FIG. 7(a) and 7(b) are schematic side elevations for explaining an initial contact mechanism of the manufacturing apparatus of the present invention.
Figure 7B:
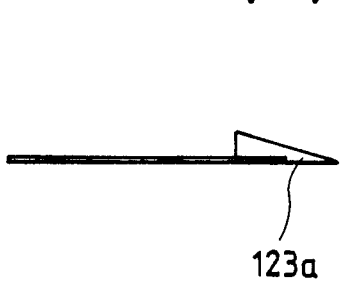

The initial contact mechanism 120 is equipped, as shown in FIG. 7(a), with an arm 122 which is hinged to a rotation mechanism 121 fixed to the casing 10 so that is can move in parallel with the turntable surface. The arm 122 carries a push member 123 at its free end portion. If the arm is moved over the disc and the push member 123 is moved downward, this push member 123 inclines the disc to force it into contact with the photopolymer 30. The initial contact mechanism 120 can be modified to control the downward velocity of the push member 123 or to use a push member made of a different material, or to have a different shape or weight so that it can apply the optimum pressure to the disc 29 in accordance with the kinds of the discs used such as polycarbonate, epoxy or PMMA resin. As shown in FIG. 7(b), the push member 123 may be replaced by an inclining wedge 123a, which is adapted to incline the dropping disc 29, while supporting it, to force it into contact with the photopolymer 30.

Figure 8:
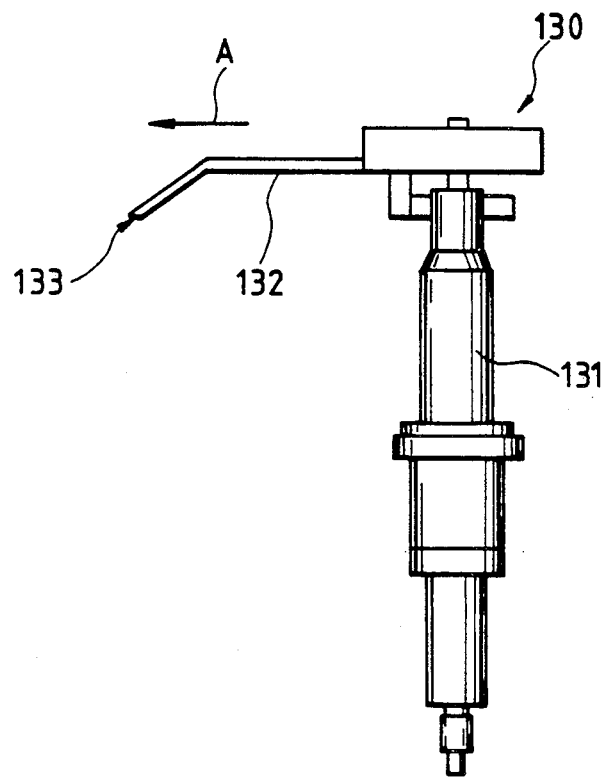
FIG. 8 is a schematic side elevation for explaining an external excess photopolymer suction mechanism.

The excess photopolymer suction mechanism 130 is equipped, as shown in FIG. 8, with an arm 132 which is hinged to a rotation mechanism 131 fixed to the apparatus casing 10 so that it can move in parallel with the turntable surface. The arm 132 carries at its free end portion a suction nozzle 133 for sucking the excess photopolymer which may overflow from between the stamper 15 and the disc 29. Since the suction nozzle 133 is biased in the direction of arrow A by a spring or the like, it can be extended and contracted in its longitudinal direction. In this construction, the circumference of the turning disc can be properly followed by the suction nozzle 133, even if its circumferential edge is burred or deformed, thus preventing irregular suction of the photopolymer.

Only one excess photopolymer suction mechanism 130 having the suction nozzle 133 is shown facing the guide groove 11, but a plurality of similar mechanisms may be disposed along the casing 10. With such a plurality, the photopolymer overflow can be immediately sucked away.

The arms of those mechanisms 110, 120 and 130 are positioned above the casing 10, while they are inoperative, but can rotate so they are above the turntable during operation so that their discharge nozzle 113, push member 123 (or inclining wedge 123a) and suction nozzle 133 can perform their respective operations upon the disc. In mechanisms 110, 120 and 130, moreover, each of the rotation mechanisms 111, 121 and 131 is equipped with an air cylinder mechanism for moving the corresponding arm in parallel and generally normal to the turntable surface. Additionally, in the individual mechanisms 110, 120 and 130, vertical movement controlled by their air cylinder mechanisms, turning controlled by their turn mechanisms, discharge of the photopolymer from the discharge nozzle 113, and suction by the suction nozzle 133 are accomplished by independent means such as motors or electromagnetic valves and are controlled by the control unit 200 shown in FIG. 1.

Figure 9:
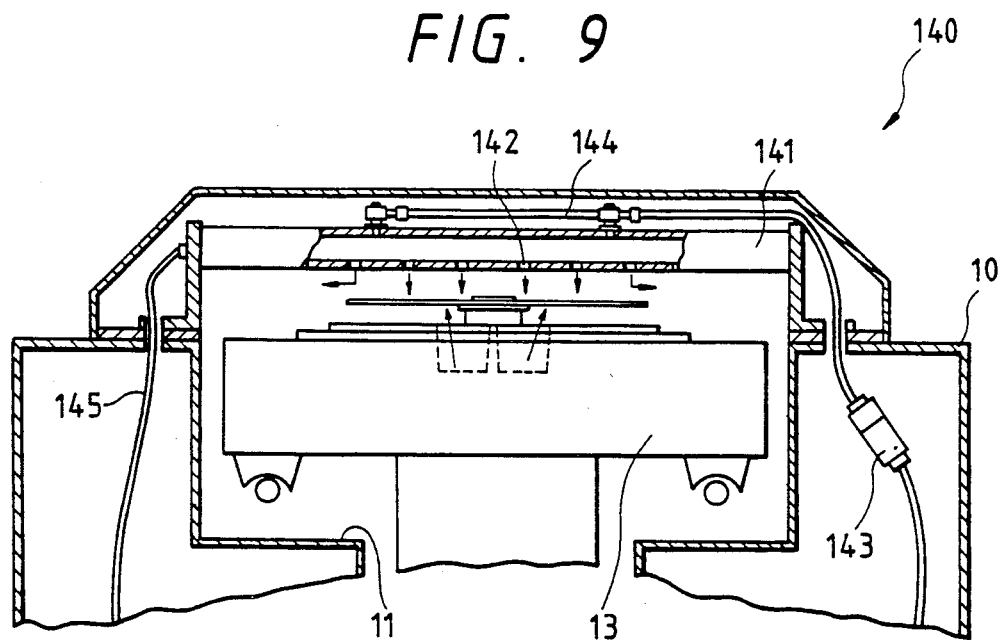
FIG. 9 is a schematic partial section showing a separating static eliminator and taken along line B—B of FIG. 2.

In the adjoining second station II, there is disposed across the guide grooves 11 a separating static eliminator 140 for spraying ionized gas onto the disc when the disc and the photopolymer are to be separated from the stamper 15 after the setting operation. In this separating static eliminator 140, as shown in FIG. 9, a tube 141 is fixed over the casing 10 across the, guide groove 11. This tube 141 is formed with a plurality of gas injection ports 142 which are opened toward the turntable surface lying on the carriage base 13. Thus, ionized gas is injected from the injection ports 142 to the track of the carrying base 13 by introducing the gas from the side of the tube 141 through a gas filter 143 and a gas passage 144 and by applying an electric voltage to the tube 141 through an electric wire 145.

Figure 10:
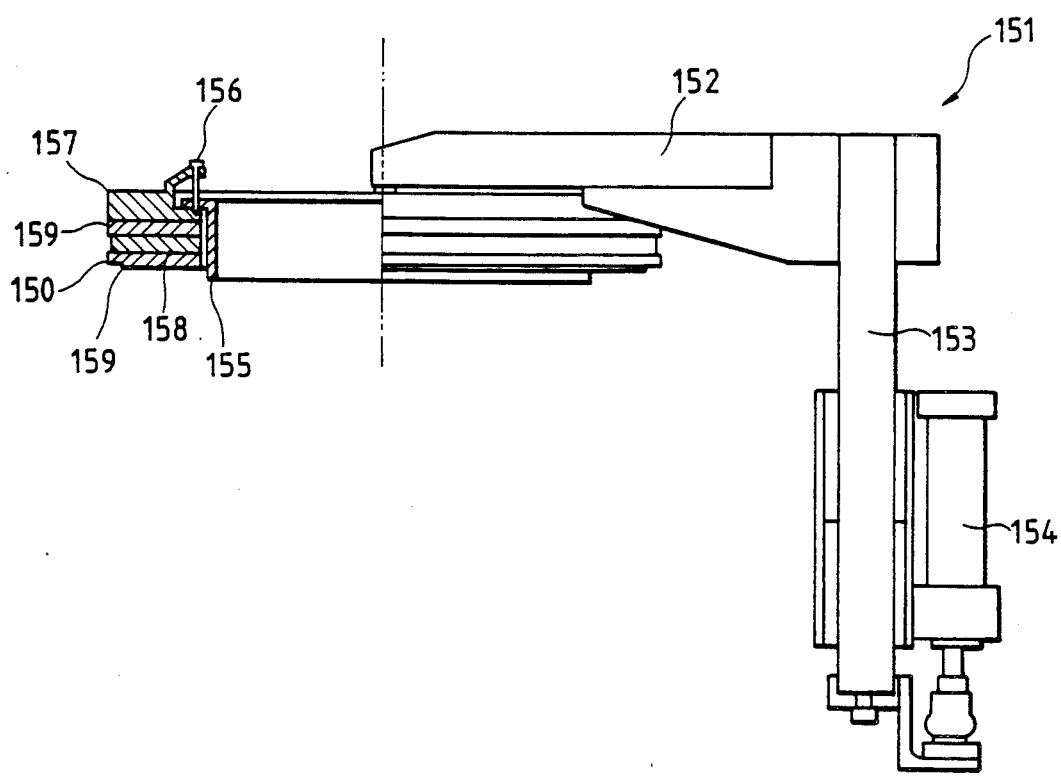
FIG. 10 is a schematic cut-away side elevation for explaining a push defoaming mechanism of the manufacturing apparatus of the present invention.

Subsequently, at the third station III, as shown in FIG. 2, there is disposed over the casing 10 across the guide groove 11 a pressure defoaming mechanism 151 which has an outer circumferential ring 150 which is in close contact with the stamper and clamps the outer circumferences of the stamper and the disc with the photopolymer in between. This pressure defoaming mechanism 151, as shown in FIG. 10, includes the outer circumferential ring 150, a pair of arms 152 supporting the circumferential ring 150, a shaft 153 and a lift mechanism 154 for moving the circumferential ring 150 and the arms 152 up and down. The pressure defoaming mechanism 151 moves the outer circumferential ring 150 up and down in parallel with the turntable surface. In addition, the defoaming mechanism 151 has an inner circumferential ring 155 inside of the outer circumferential ring 150. The inner circumferential ring 155 is mounted thereto by a plurality of bolts 156 and is concentrically and loosely fitted in and supported by the outer circumferential ring 150. This outer circumferential ring 150 is a three-layered annulus, in which a silicone sponge ring 158 is sandwiched between a base 157 and an acrylic ring 159 so that it can apply the pressure uniformly to the disc and soften the shocks when in contact with the disc.

Figure 11A:
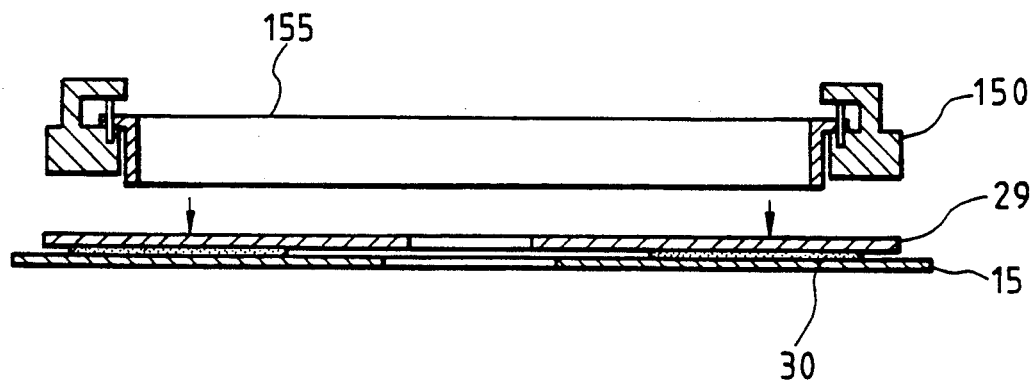
FIG. 11(a) and 11(b) are schematic sections for explaining an outer circumferential ring.
Figure 11B:
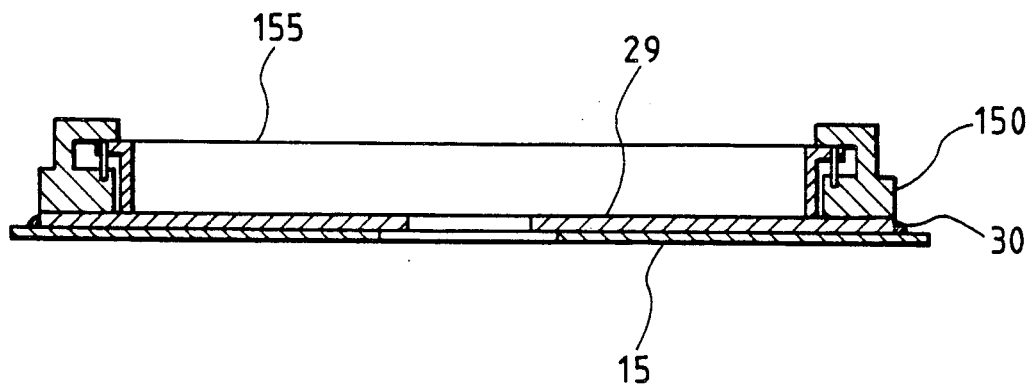

As better seen in FIG. 11(a), the inner circumferential ring 155 is a metallic or plastic annulus which has its pressure surface protruding from the pressure surface of the outer circumferential ring 150 before it presses the disc 29. The outer circumferential ring 150 has a wider pressure surface than that of the inner circumferential ring 155. As shown in FIGS. 11(a) and 11(b), the inner circumferential ring 155 and then the outer circumferential ring 150 abut against the disc 29 in case the latter ring 150 moves down. Thus, these outer and inner circumferential rings fix the entire outer circumference of the disc 29.

Between the third station III and the initial station 0, as shown in FIG. 2, there is disposed over the casing 10 across the guide groove 11 a radiation exposer 160 which has an ultraviolet lamp. This ultraviolet lamp is directed toward the track of the carriage base 13 so that the disc may be exposed to the radiation exposer 160 while being carried by the carriage base 13 below the radiation exposer 160.

Figure 12:
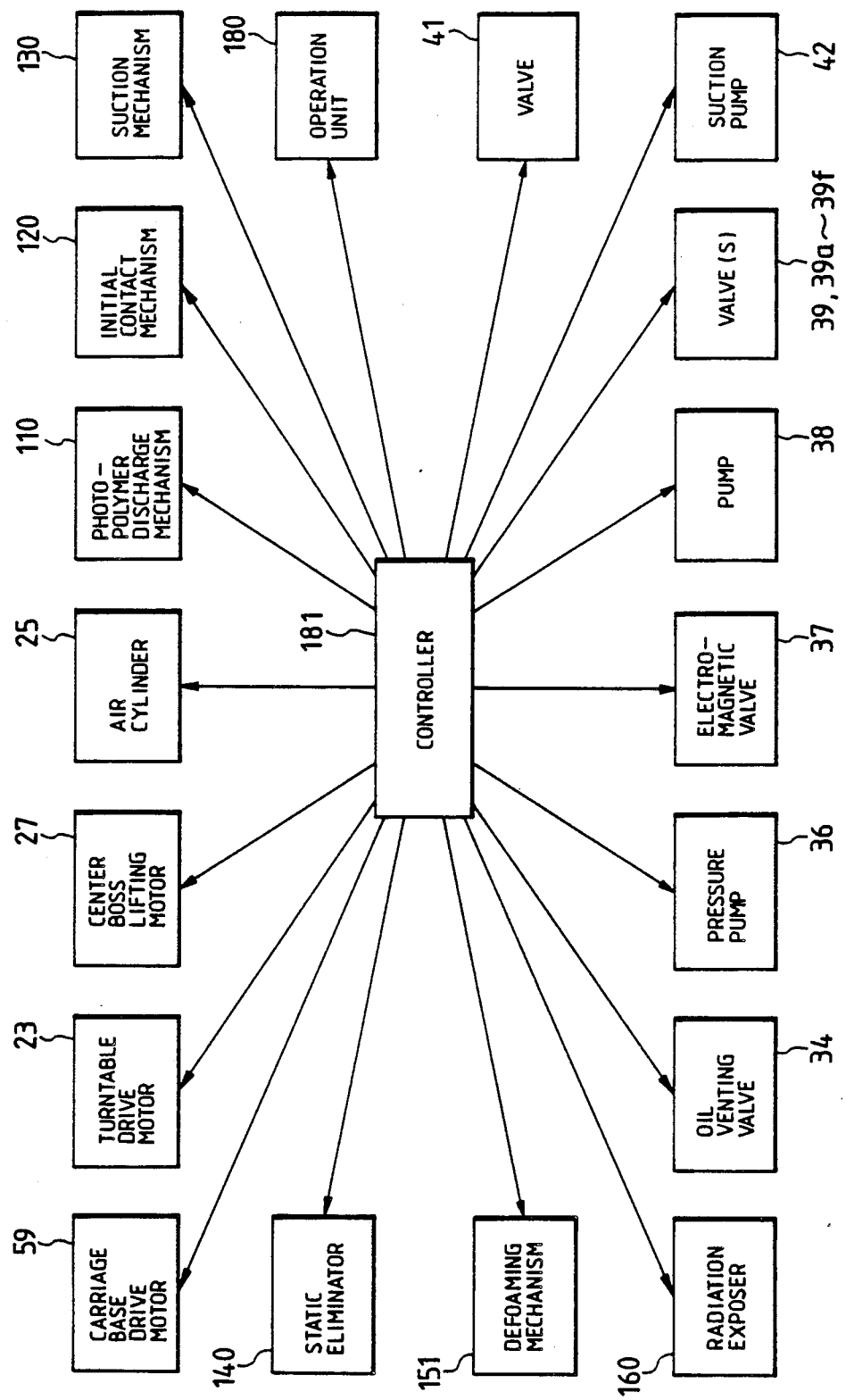
FIG. 12 is an explanatory view showing a control unit.

As shown in FIG. 12, the control unit 200 for controlling the individual mechanisms of the carriage base and the individual stations has a controller 181 which is responsive to the instructions of an operation unit 180 to control at least: the carriage base drive motor 59; the turntable drive motor 23; the center boss lifting motor 27; the air cylinder 25 for driving the chuck disposed in the head of the center boss; the photopolymer discharge mechanism 110; the initial contact mechanism 120; the excess photopolymer suction mechanism 130; the separating static eliminator 140; the pressure defoaming mechanism 151; the radiation exposer 160; the air venting electromagnetic valve 34 for opening or closing to vent the center recess of the turntable to the atmosphere; the pressure pump 36 for supplying the pressurized gas into the recess when in the initial contact and the disc separation; the electromagnetic valve 37 for pressure pump communication; the pressure-reducing pump 38 for reducing the pressure in the recess during the pressurized defoaming operation; the electromagnetic valve 39 or valves 39a to 39f for pressure-reducing pump communication; the suction pump 42 communicating with the suction nozzle 133 for sucking away the excess photopolymer; and the electromagnetic valve 41 for suction pump communication. The control unit 200 acts to control the gas pressure control means.

Figure 13A:
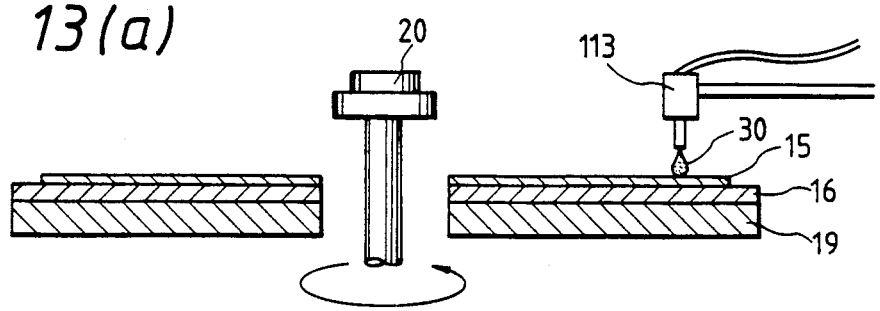
FIGS. 13(a) to 13(n) are schematic sections for explaining a manufacturing process using the manufacturing apparatus of the present invention.
Figure 13B:
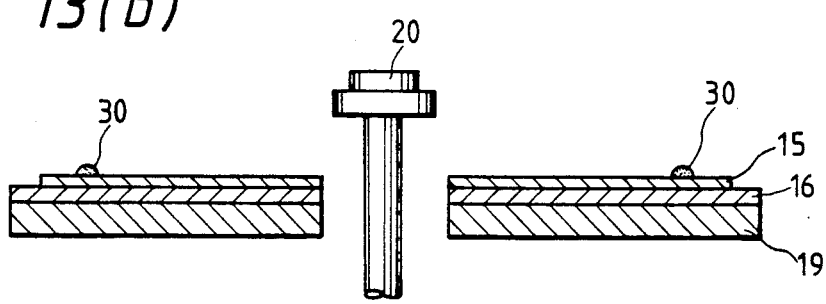
Figure 13C:
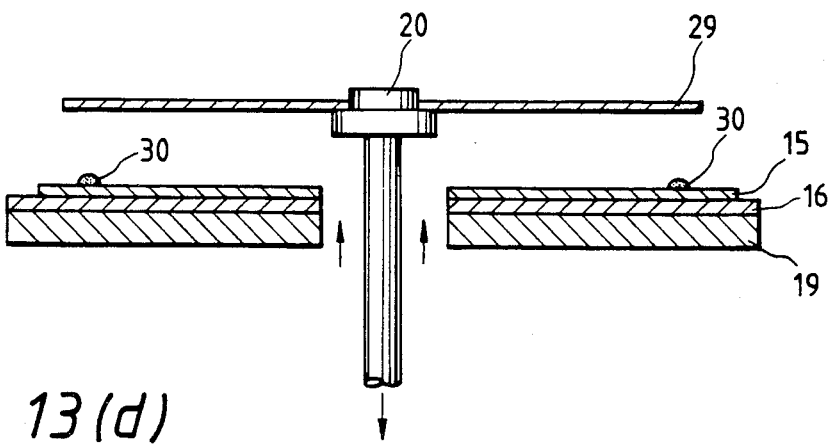
Figure 13D:
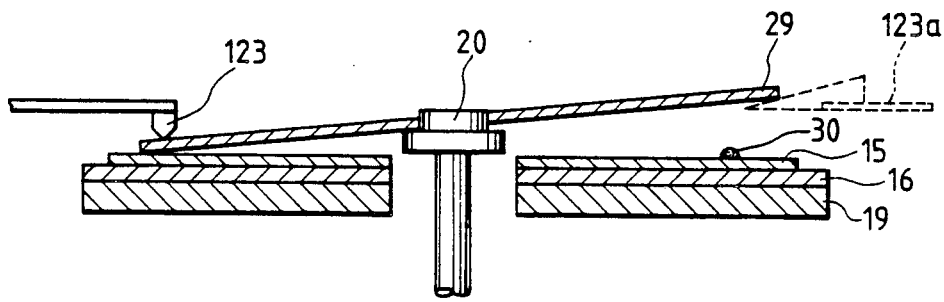
Figure 13E:
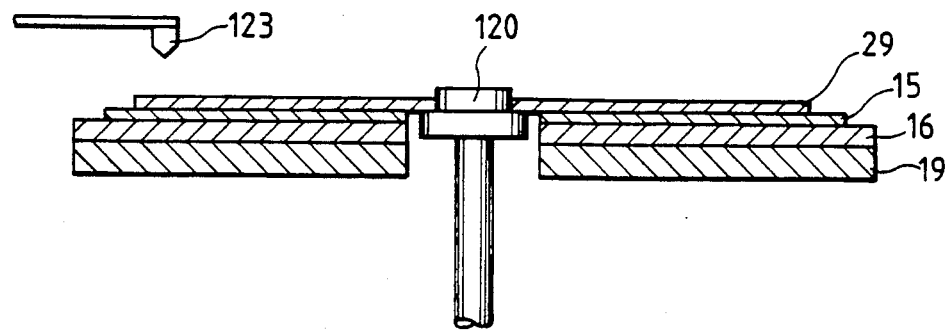
Figure 13F:
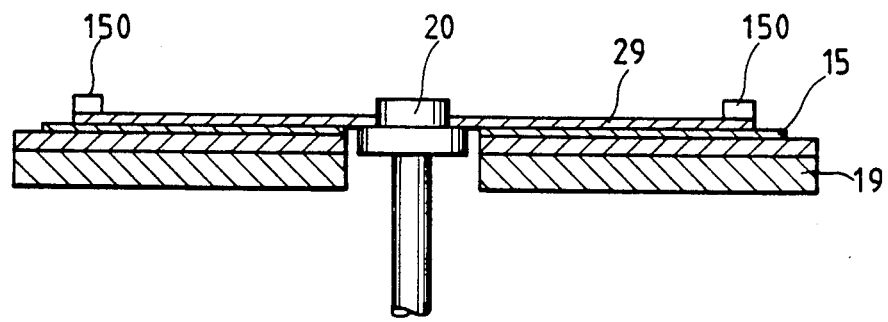
Figure 13G:
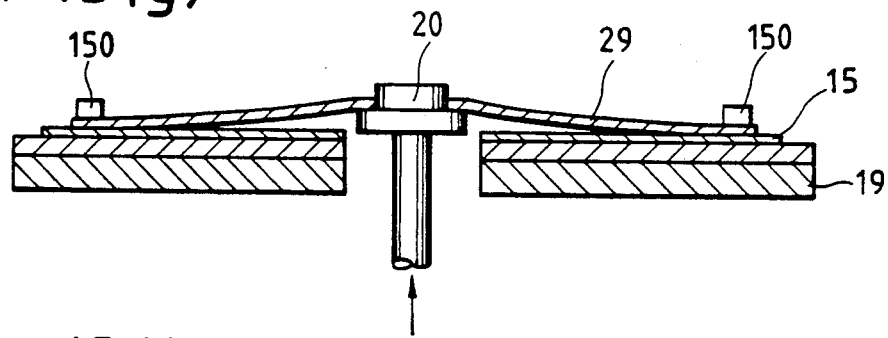
Figure 13H:
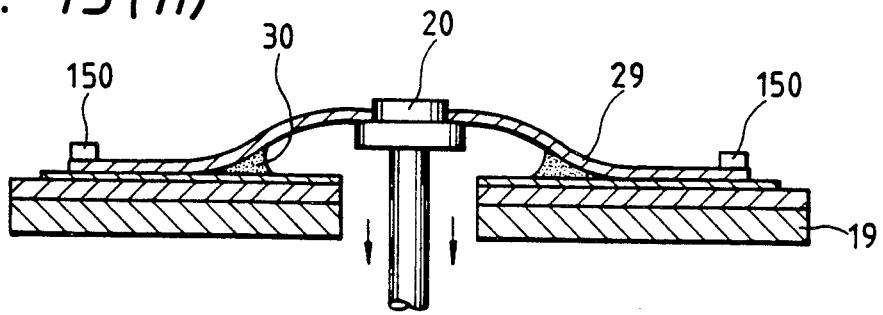
Figure 13I:
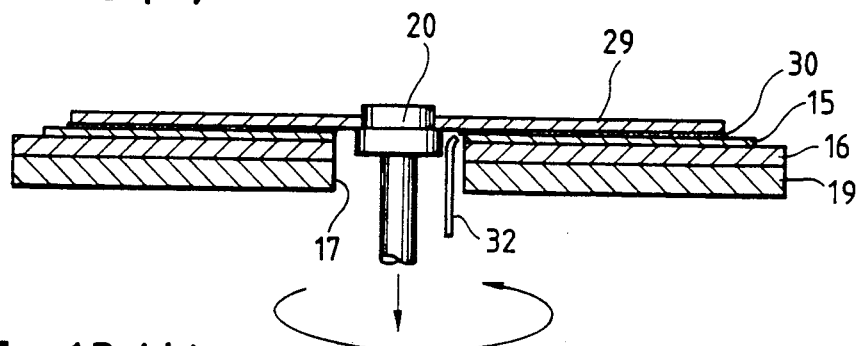
Figure 13J:
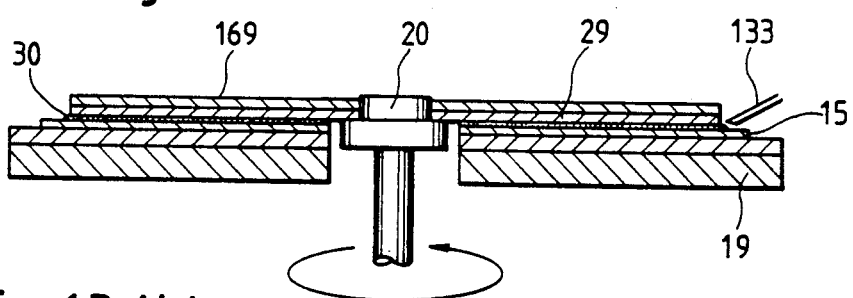
Figure 13K:
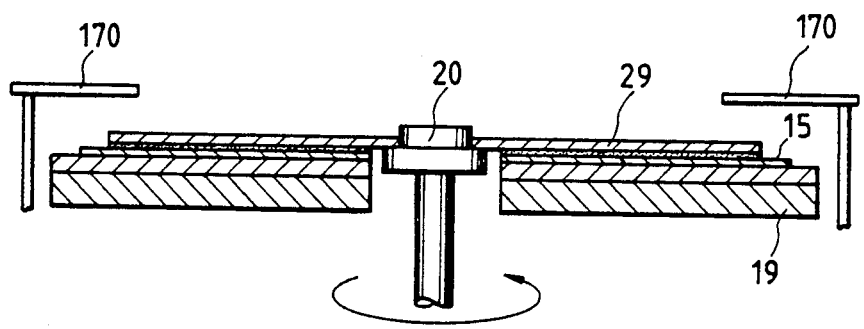
Figure 13K:
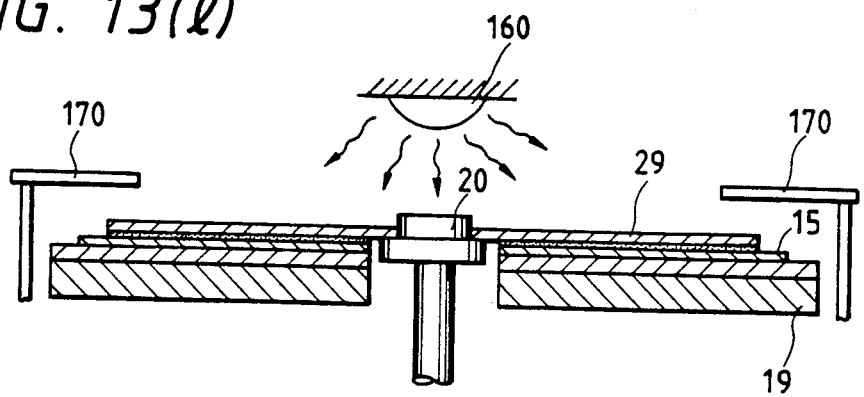
Figure 13M:
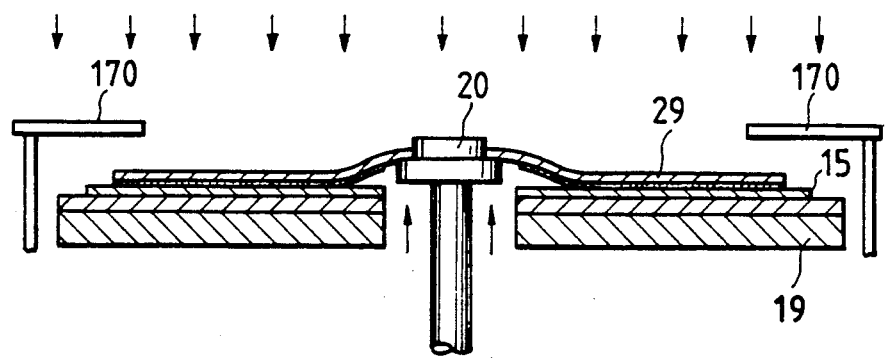
Figure 13N:
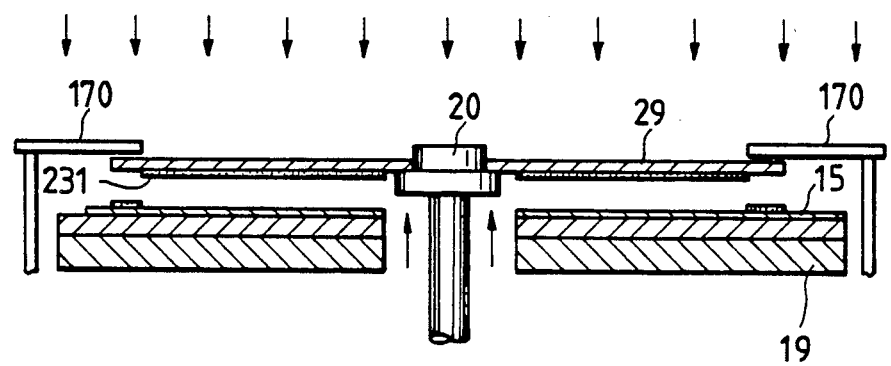

FIGS. 13(a) to 13(n) are schematic sections showing the portion of the optical disc manufacturing apparatus of the present embodiment during the transfer process. This transfer process will be described sequentially according to its steps.

(1) Centering Step:

First of all, the carriage base is moved to and stopped at the initial station 0 of the apparatus. The turntable having the stamper 15 mounted on its stamper base 16 as shown in FIG. 3, is rotated. An image of the circumferential edge of the annular transfer region of the stamper 15 is enlarged by the microscope 101 and projected on the display 100. The stamper base 16 is moved by the eccentricity adjusting mechanism to eliminate the fluctuations of the circumferential edge of the annular transfer region due to any eccentricities. Thus, the annular transfer region of the stamper 15 and the center boss 20 are centered so that the annular transfer region may turn concentrically on the center axis of the center boss 20.

(2) Photopolymer Discharge Step:

Next, the carriage base is moved from the initial station 0 and stopped at the first station I. As shown in FIG. 13(a), the turntable 19 having the stamper 15 mounted thereon is rotated. The arm of the photopolymer discharge mechanism 110 is rotated so that it is disposed above the stamper 15, and a predetermined amount of photopolymer 30 is discharged from the discharge nozzle 113 to the annular transfer region of the stamper 15 as it is rotated. The photopolymer 30 then assumes the shape of an annular bank on the annular transfer region (as seen from FIG. 13(b)). The photopolymer 30 in the form of the annular bank is located in the vicinity of the position where the annular pressure surface of the inner circumferential ring 155 formed on the outer circumferential ring 150 is located during a later-described pressure foaming step. After this, the arm is returned to its original position over the casing 10. The rotation of the turntable 19 is stopped so that the annular bank shape of the photopolymer does not collapse.

Next, the center boss 20 is lifted to its uppermost position, and the flat, transparent disc 29 made of PMMA is placed on the flat stamper base of the flange such that its inner circumference is fitted in the head of the center boss.

(3) Initial Contact Step:

Next, as shown in FIG. 13(c), while the carriage base remains at the first station I, the center boss 20 is dropped (as indicated at a downward arrow) to its lowermost position to bring the disc 29 into contact with the photopolymer 30 raised in the annular bank shape on the stamper 15.

Figure 14A:
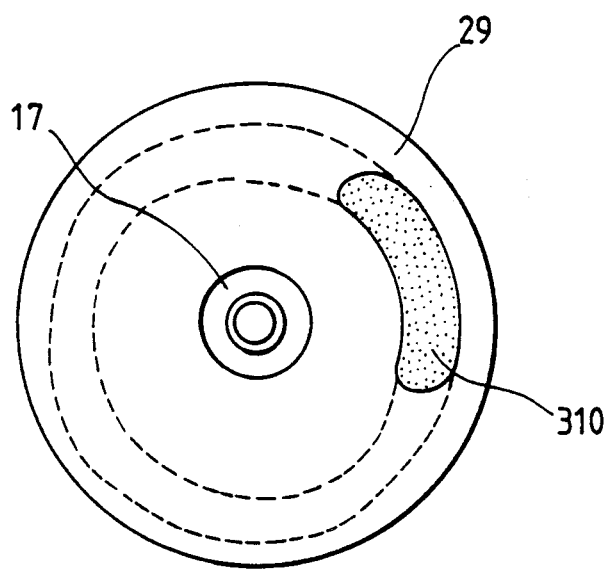
FIG. 14 is a top plan view showing a disc at an initial contact step.
Figure 14B:
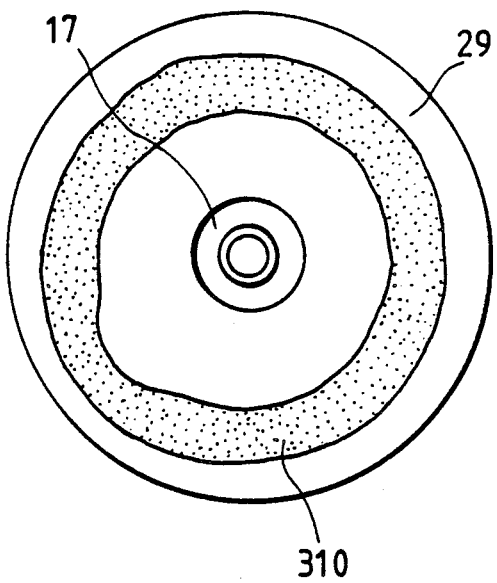
Figure 14C:
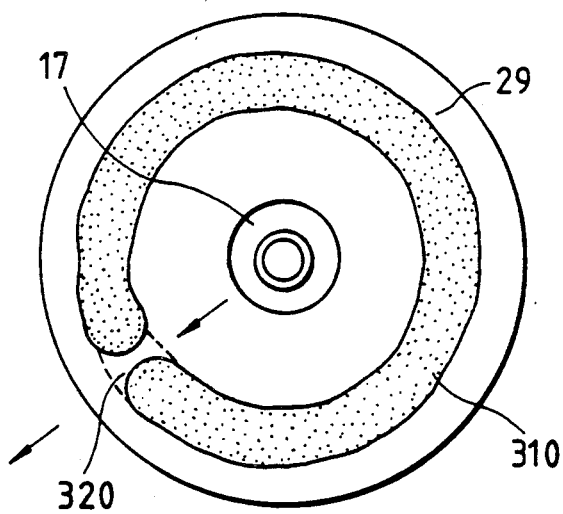
Figure 16A:
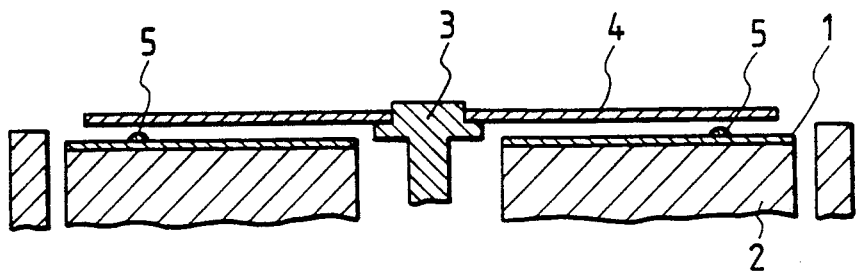
FIGS. 16(a) to 16(e) are schematic sections for explaining the manufacturing process according to a convention apparatus.
Figure 16B:
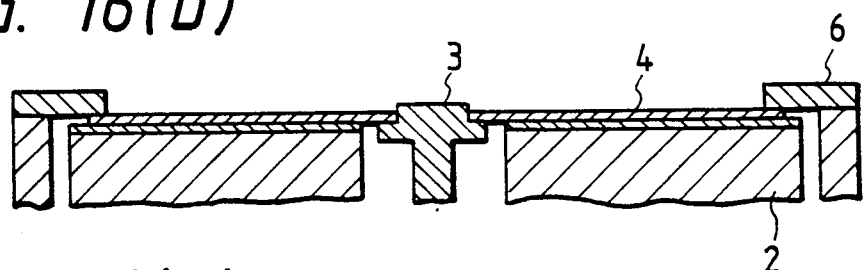
Figure 16C:
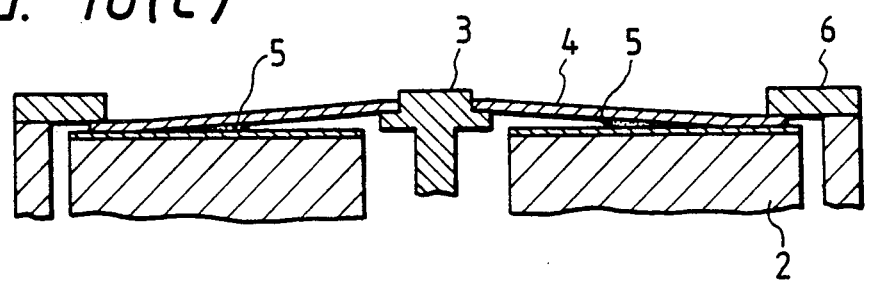
Figure 16D:
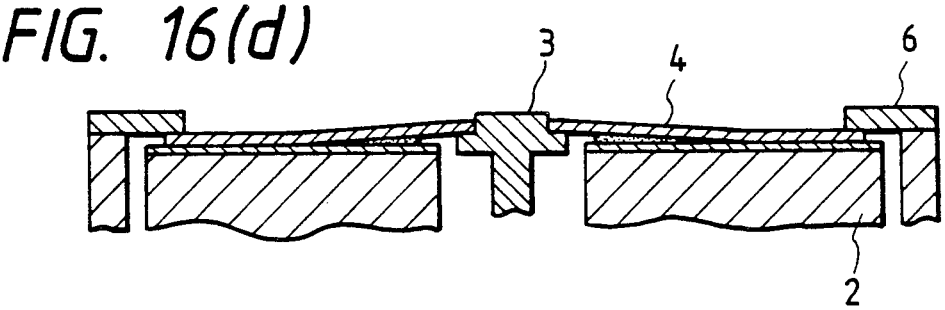
Figure 16E:
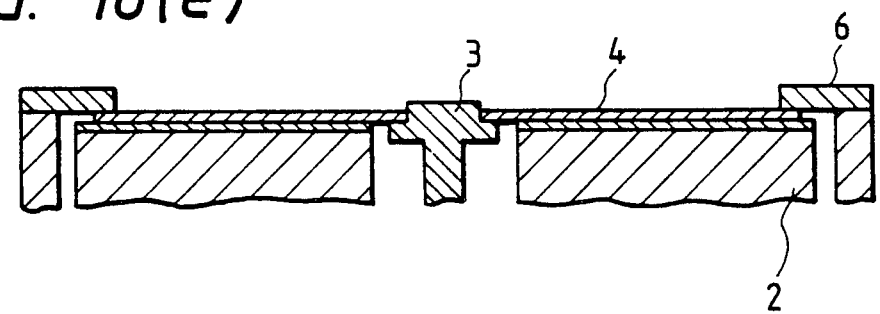

If the disc 29 and the photopolymer 30 were abruptly brought into contact in the course of the downward movement, the photopolymer would develop into foam. As shown in FIG. 4, therefore, only the electromagnetic valve 37 is released, when the center boss 20 and disc 29 reach the midpoint of the downward movement, via the gas passage 31 of the center recess 17 of the turntable 19 so that the pressurized gas is supplied to the vicinity of the center boss 20 by the pressure pump 36, thus establishing a weak rising gas flow (as indicated at upward arrows). This gas flow decelerates the downward velocity of the disc to avoid the abrupt contact between the photopolymer 30 in the annular bank shape and the disc 29. The contact between the disc 29 and the photopolymer 30 is accomplished so that a contact area 310 gradually spreads from a certain point of the ridge of the annular bank of the photopolymer 30 along the ridge sequentially in the order shown in FIGS. 14(a) to 14(c). At this time, gas will flow (as indicated by a radial arrow) from the center recess 17 through a pass 320 where the annular bank does not merge. At the instant of this initial contact (as shown in FIG. 14(a)), the supply of pressurized gas to the vicinity of the center boss 20 is interrupted.

As a result, the pass 320 in the annular groove of the photopolymer 30 provides a vent port for the gas. According to the conventional technique, the disc 29 and the photopolymer 30 will be abruptly attracted by the action of the surface tension of the photopolymer 30 to confine foams in the polymer. Since, however, the contact is thus gradually effected at a fine angle by the gas outflow from vent hole 320, it is possible to minimize the confinement of the foams in the photopolymer.

At this initial contact step, as shown in FIGS. 13(d) and 13(e), the initial contact mechanism 120 is driven simultaneously with the supply of the pressurized fluid to the vicinity of the center boss 20 while the center boss 20 moves downward. The arm of the initial contact mechanism is rotated so that it is disposed above the disc 29 as it moves downward, and the push member 123 at its free end is moved downward to push the disc 29. When an initial contact mechanism (as indicated by broken lines) carrying the inclining wedge 123a is rotated so that it is disposed below the disc 29 moving downward, the inclining wedge 123a is stopped or dropped at low speed to push the disc upward.

Thus, the disc 29 is tilted so that a portion contacts the ridge of the annular bank of the photopolymer 30. The contact area gradually spreads along the ridge of the annular bank from the initial contact point between the disc 29 and the photopolymer. After achieving the initial contact point (shown in FIG. 14(a)), the supply of the pressurized gas to the vicinity of the center boss 20 is interrupted, and the arm is returned to its original position over the casing 10, which is followed by the stopping of the drive of the initial contact mechanism.

Thus, the disc is forcibly inclined by the push member 123 against the resistance caused by the pressurized gas coming from the recess to brake the movement of disc moving downward. Thus, the time period for the dropping disc in order to develop initial contact with the photopolymer is reduced.

The gas supply by the gas pressure control means is stopped by closing the electromagnetic valve 37, and the electromagnetic valve 34 communicating with the gas passage 31 is opened to establish communication between the center recess 17 of the turntable 19 and the outside to prepare for the subsequent step.

(4) Pressure Defoaming Step:

Next, the carriage base is moved from the first station I and stopped at the third station III. The chuck at the head of the center boss 20 is actuated to fix the disc at its lowermost position. At this time, the disc 29 is temporarily centered.

Next, the outer circumferential ring 150 is moved downward, as shown in FIG. 13(f).

Since, in this case, the inner circumferential ring 155 is loosely fitted with a protrusion in the inner circumference of the outer circumferential ring 150, it first abuts against the disc, followed by the outer circumferential ring, as shown in FIG. 11. These outer and inner circumferential rings fix the entire outer circumferential portion of the disc 29 so that the stamper 15 and the disc 29 closely contact one another at their outer circumference through the photopolymer. This photopolymer 30 flows toward the outer circumference to fill up the clearance between the disc 29 and the stamper 15 until it is discharged from their outermost circumferential portions. At this time, the inner circumferential ring 155 having a smaller contact area and the outer circumferential ring 150 having a larger contact area force the photopolymer beneath the disc together with the foams so that very little foam is contained in the photopolymer below the outer circumferential ring 150 and the disc 29.

Next, the chuck of the head of the center box 20 is loosened to keep the inner circumference of the disc away from any damage during a subsequent step.

Next, the center boss 20 is lifted (along an upward arrow), as shown in FIG. 13(g). The disc is deformed into a conical or Konide shape as shown, because its outer circumferential portion is fixed by the outer circumferential ring 150. At this time, a flattened conical closed space is formed in the recess between the disc 29 and the stamper 15. At the boundary where the disc 29 and the stamper 15 are separated, the photopolymer 30 becomes stagnant in an annular form and spreads toward the outer circumference as the center boss rises.

Next, as shown in FIG. 13(h), the center boss is stopped at a predetermined upper position. At this time, the evacuation is started (in the direction of downward arrows) by closing the electromagnetic valves 34 and 37 which communicate with the center recess 17, as shown in FIG. 4, to break the communication between the outside through pressure pump 36 and the closed space but by opening the electromagnetic valve 39 (or one of the grouped electromagnetic valves) to connect the gas passage 31 with the pressure-reducing pump 38. Then, the gas under vacuum vibrates the inner circumference of the stagnant photopolymer 30 to reduce the foams in the photopolymer.

If an abrupt evacuation is accomplished for the pressure reduction, the stagnant photopolymer will confine the foams. Hence, the evacuation is accomplished gradually as to draw a gentle curve.

Since a plurality of, e.g., six electromagnetic valves 39a to 39f are connected in parallel with the gas passage 31 communicating with the recess 17, as shown in FIG. 4, a predetermined degree of vacuum can be achieved along a predetermined pressure-reducing curve by sequentially opening those electromagnetic valves during a predetermined time period from the start of evacuation.

In the case of transfer of an 8 inch disc, for example, the evacuation through the grouped electromagnetic valves 39a to 39f is accomplished under the conditions specified in Table 1:

TABLE 1

| | |
|---|---|
| Degree of vacuum to be reaches (i.e., Pressure difference from atmosphere) | 100 mm Hg |
| Time from start of evacuation | 22 sec. |
| Stop position of center boss (i.e., Height of disc carrying surface of center boss from stamper surface at start of evacuation) | 7 mm |
| Position of center boss at the end of transfer (i.e., Height (or the lowermost position) of disc carrying surface of center boss from stamper surface immediately before exposure to ultraviolet rays) | 0.05 mm |
| Amount of discharge of photopolymer | 2.2 g |
| Rising timing of outer circumferential ring | 100 mm Hg. |

Figure 15:
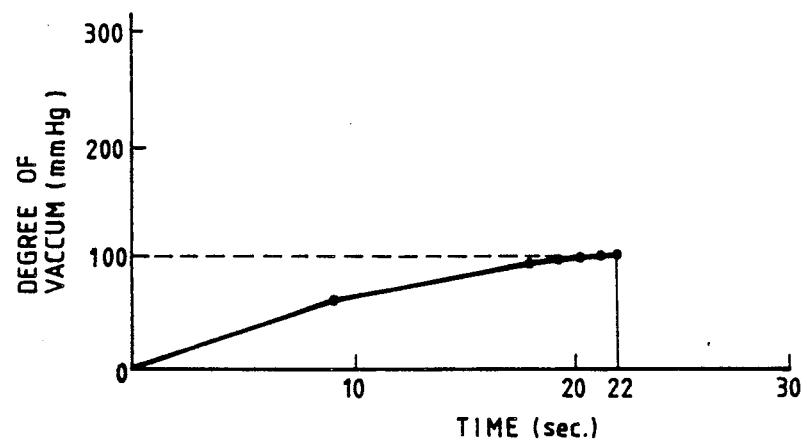
FIG. 15 is a graph plotting a pressure-reducing curve of a center recess of a turntable.

In this case, the pressure-reducing curves is plotted to have a gradient, as shown in FIG. 15. As shown, six points plot the sequential opening times of the electromagnetic valves 39a to 39f and the degrees of vacuum at those timings.

With an 8-inch disc, any substantial foam is contained if a degree of vacuum of 100 mm Hg is established for 22 sec. Thus, the development of foam can be prevented by such slow evacuation.

These pressure-reducing conditions in the closed space are influenced by the viscosity and amount of the photopolymer and the size of the disc, i.e., the volume of the closed space having the Konide shape. The following results were obtained when discs of 8 and 5 inches are used with photopolymer having a viscosity of 500 cP or less, for example. The content of foams increased for a time period of 10 seconds or less when the 8-inch disc was used under the degree of vacuum of 100 mm Hg. The content of foams could be prevented even if the time period was shortened to several sec., in the case of the 5-inch disc. The time period may be elongated to 22 sec. or more, but this elongates the processing time period of the apparatus. The degree of vacuum usable may range from 30 to 500 mm Hg for either of the time periods. Small foams cannot be eliminated under a vacuum degree lower than 30 mm Hg. and too much photopolymer will be discharged under a degree of vacuum higher than 500 mm Hg, from the inner circumference of the stamper at the lowermost position of the center boss 20 so that the film thickness of the photopolymer cannot be satisfactorily maintained.

Incidentally, in order to effect the pressure reduction according to the pressure-reducing characteristic curve, a vacuum degree of 100 mm Hg is achieved by connecting the six electromagnetic valves 39a to 39f in parallel with the gas passage 31 communicating with the recess 17, as shown by the broken lines in FIG. 4, and by sequentially opening those valves within 22 sec. from the start of evacuation. The gas pressure control means can be simplified by initially setting the capacity of the plenum chamber 40, as shown by the solid line in FIG. 4, so that a generally linear pressure-reducing curve may be obtained to establish the vacuum degree of 100 mm Hg within 22 sec. during the evacuation. If, in this case, the plenum chamber to be connected upstream of the pressure-reducing pump is replaced by another having a different capacity, the desired pressure-reducing characteristics can be obtained merely by controlling the opening operation of the electromagnetic valve 39.

Next, the center boss 20 is moved downward while the evacuated state of the center recess 17 and the closed space is maintained. Then, the stagnant photopolymer 30 between the stamper 15 and the disc 29 will advance from the outer circumference to the inner circumference so that the photopolymer 30 uniformly fills up the clearance between the disc 29 and the stamper 15.

Next, as shown in FIG. 13(*i*), the center boss 20 is dropped and stopped when the surface of the flange of the center boss carrying the disc reaches its lowermost position. Then, the stagnant photopolymer reaches the innermost circumferential portion of the annular transfer region so that it is discharged together with the residual foam, if any, from the innermost circumferential portion into the recess 17.

Uneven circumferential filling of the photopolymer on the stamper, as experienced in the prior art can be prevented so that the present invention can evenly fill up the disc-stamper clearance without any foam confinement, by thus moving the photopolymer while fixing the outer circumference of the disc and moving the inner circumference upward and downward.

Next, the outer circumferential ring 150 is lifted while maintaining the evacuated state of the closed space of the recess 17 in the vicinity of the center boss 20.

(5) Excess Photopolymer Sucking Step:

Next, as shown in FIGS. 13(*i*) and 13(*j*), the turntable 19 is rotated, and simultaneously with this, the excess photopolymer suction mechanism having the suction nozzle 32 fixed in the center recess 17 of the turntable 19 is actuated. The suction portion of the suction nozzle 32 sucks the excess photopolymer which has been discharged along the entire inner circumference of the stamper 15.

At this time, as shown in FIG. 4, the degree of vacuum of the closed space of the center recess 17 is increased by the suction of the suction pump 42. In order to prevent this rise, only the electromagnetic relief valve 34 is released to establish communication between the recess 17 and the outside. Simultaneously, with the start of suction, the vacuum degree of 100 mm mercury is maintained by introducing the atmosphere through the relief valve 35 to adjust the amount of suction of the suction nozzle 32 by the gas pressure control means. In order that the vacuum degree is thus maintained by the suction of the suction nozzle 32, the gas leakage of the relief valve 35 is initially set while using a pressure gauge to measure the vacuum degree during the suction.

Next, the carriage base is moved from the third station III and stopped at the first station I.

At this time, as shown in FIG. 13(*j*), a circular cover mask 169 is placed on the disc 29 to cover the entire surface of the disc. Then, the external excess photopolymer suction mechanism 130 is operated. The arm is rotated so that it is disposed over the outer circumferential edge of the disc and at its free end, suction nozzle 133 sucks the excess photopolymer which has been discharged along the outer circumferences of the disc 29 and a stamper 15 as they are rotated. After this suction of the excess photopolymer, the cover mask 169 is removed. The splash of the photopolymer during the suction is prevented from wetting the disc surface by attaching the cover mask 169 before the suction of the excess photopolymer by the suction nozzle 133.

Next as shown in Fig. FIG. 13(*k*), an outer circumferential mask 170 is placed over the turntable 19 to cover the outer circumferential edge of the disc 29. This outer circumferential mask 170 is composed of an annular member and its supporting legs. These legs are positioned around the turntable so that the annular member is spaced apart from the disc. On the other hand, the outer circumferential mask 170 need not have legs but only the annular member which is placed directly on the disc. The exposure of the outer circumferential edge of the disc to ultraviolet rays is shielded by the outer circumferential mask 170, and the photopolymer of the outer circumferential edge is set later so that no burrs are formed at the outer circumferential edge of the transfer layer of the photopolymer. Moreover, the outer circumferential edge of the disc, which is shielded from exposure to the ultraviolet rays by the outer circumferential mask 170, provides a margin to which an outer circumferential spacer may be connected when the optical disc is to be assembled.

For a predetermined time period the excess photopolymer is removed from the inner and outer circumferences of the disc, and then the operations of the excess photopolymer suction mechanism are stopped.

(6) Radiation Exposing Step:

The chuck of the head of the center boss 20 is operated to center the disc 29 being turned while being covered with the outer circumferential mask 170.

Next, the carriage base is moved from the first station I and stopped at the third station III.

The operation of the chuck of the center boss head is interrupted to leave the disc 29 floating on the photopolymer over the stamper. In this state, any offset of the disc from the stamper 15 can be avoided because the center recess is evacuated.

Next, the shutter of the ultraviolet ray exposure lamp 160 interposed between the third and initial stations III and 0 is opened. The carriage base is moved from the third station III to the initial station I, as shown in FIG. 13 (*l*), while the disc 29 is rotated below the ultraviolet ray exposure lamp. The carriage base is then moved, while turning the disc, from the initial station 0 to the second station II. Thus, the disc is twice passed below the ultraviolet ray lamp 160 so that the photopolymer may be set by the uniform exposure of the disc 29 to the ultraviolet rays.

In this step, the chuck of the head of the center boss 20 is operated to center the disc, and the disc is exposed to the ultraviolet rays while it is not fixed but floats on the photopolymer. This is so that shapes of the pits to be transferred through the photopolymer being set are maintained. If the chuck of the center boss were operated to fix the disc, the fine, eccentric motions of the center boss would occur while the photopolymer iL being set, so that shearing stress is generated between the disc and the stamper thus forming inaccurate pit shapes.

(7) Disc Separating Step:

Next, after exposure to the ultraviolet rays, the carriage base is moved from the initial station 0 to the second station II and is stopped at a position below the separating static eliminator, where the diameter of the disc 29 is generally aligned with the row of the ionized gas injection ports of the separating static eliminator. Then, the rotation of the turntable is stopped. The separating static eliminator at the second station II is operated to inject the ionized gas (downward in the directions of the arrows), and the pressurized gas is supplied from below the disc into the recess 17 (upward in the direction of the arrows). Below the separating static eliminator, the center boss 20 is lifted (as shown in FIG. 13(m)) to separate the disc from the stamper (as shown in FIG. 13(n)). Thus, it is possible to manufacture the disc 29 which carries a transfer layer 231 of set photopolymer having the fine undulations of the stampers 15 transferred thereto.

The separating static eliminator is laid across the guide groove and stopped in such a manner that the diameter of the disc on the carriage base is aligned with the row of the gas injection ports of the ionized gas. As a result, the ionized gas injected from the gas injection ports impinge upon the principal surface of the disc. The ionized gas does not impinge directly upon the transfer layer but eliminates the static electricity, which is generated on the surface of the disc when this disc is to be separated from the stamper 15, to prevent any dust from being caught by the static electricity. Moreover, the ionized gas is supplied downward from the separating static eliminator whereas the pressurized gas is supplied upward from the center recess 17, and the gas is sucked downward from the clearance between the outer circumference of the turntable 19 and the casing 10. Thus, it is possible to prevent fine pieces of the set photopolymer from falling on the stamper 15 while the disc is being separated.

Next, the carriage base is moved from the second station II and stopped at the first station I. The outer circumferential mask is removed, and the completed disc with the transfer layer is taken out.

Thus, discs with transfer layers are sequentially manufactured by repeatedly executing a series of those steps from the first station I to the third station III.

According to conventional apparatus, the stamper is protected by applying a protective film thereto when the apparatus is paused. In this case, the paste of the film will trap the forms between the film and the stamper so that the forms may possibly blot the stamper. Moreover, the film per se is too thick to provide a sufficient protection. According to the apparatus of the present invention, on the contrary, the disc can act as the protective film to ensure the protection of the stamper if the manufacture process is ended after the radiation exposure step.

As has been described above, according to the present invention, there is provided an optical disc manufacturing apparatus which includes: a turntable, a center boss, a gas pressure control means, and a pressure deforming means associated with the outer circumferential ring and the center boss to defoam the photopolymer. In this optical disc manufacturing apparatus, the turntable, the center boss and the gas pressure control means are united in the carriage base, and the carriage base itself is movable on the casing. Thus, the apparatus produces less powdered dust, confines less foam in the photopolymer at the transfer step and has realatively small dimensions. As a result, the optical discs manufactured by the apparatus according to the present invention will experience less drop-out as a result of foams in their signal transfer layers, when the information thereon is reproduced.

What is claimed is:

1. An apparatus for manufacturing a substrate having a transfer layer corresponding to an optical pattern by providing a liquid radiation-setting resin between a stamper carrying said optical pattern and said substrate and by setting said radiation-setting resin, comprising:
    a frame;
    a support member movable on said frame;
    a turntable rotatably supported on said support member and including a flat portion carrying said stamper and having a recess at the center of said turntable;
    a center boss arranged in said recess and supported on said support member such that said center boss is rotatable on a same axis of rotation as said turntable and is movable with said turntable along said axis of rotation;
    push means for pushing the outer circumference of said substrate, after said substrate is placed on said center boss, onto said flat portion of said turntable; and
    gas pressure control means communicating with said recess of said turntable for adjusting pressure in said recess.

2. An apparatus for manufacturing a substrate according to claim 1, wherein said gas pressure means, said turntable and said center boss are movable over said frame by said support member.

3. An apparatus for manufacturing a substrate according to claim 1, further comprising eccentricity adjusting means mounted on said turntable and having a micrometer for moving said flat portion of said turntable horizontally relative to said turntable.

4. An apparatus for manufacturing a substrate according to claim 1, further comprising center boss lifting means connected to said center boss for lifting said disc.

5. An apparatus for manufacturing a substrate according to claim 1, wherein said gas pressure control means includes a plurality of electromagnetic valves and a plurality of pumps.

6. An apparatus for manufacturing a substrate according to claim 1, further comprising: photopolymer discharge means for supplying said photopolymer to a principal surface of said stamper; initial contact means for inclining said substrate to force said substrate into contact with said photopolymer; and an excess photopolymer suction mechanism for sucking away excess photopolymer which overflows from between said stamper and said substrate.

7. An apparatus for manufacturing a substrate according to claim 1, further comprising a separating static eliminator for injecting ionized gas onto said substrate when said substrate and said photopolymer are to be separated from said stamper after said photopolymer has been set.

8. An apparatus for manufacturing a substrate according to claim 1, further comprising pressure defoaming means for applying a uniform pressure to the outer circumferential portion of said substrate to eliminate foams from said substrate.

9. An apparatus for manufacturing a substrate according to claim 1, further comprising a radiation exposer having an ultraviolet ray lamp for exposing said substrate to the ultraviolet rays to set said photopolymer.

10. An apparatus for manufacturing a substrate according to claim 6, further comprising a control unit responsive to instructions from an operation unit for controlling drive units for said support member, said turntable, said center boss, said push means, said gas pressure control means, said photopolymer discharge means, said initial contact means, and said excess photopolymer suction mechanism.

* * * * *